(12) United States Patent
Joo et al.

(10) Patent No.: US 8,970,943 B2
(45) Date of Patent: Mar. 3, 2015

(54) COMPOSITE FILM FOR PREVENTING FORGERY, AND COMPOSITE METHOD FOR PREVENTING FORGERY

(75) Inventors: Jae Hyun Joo, Hwaseong-si (KR); Sung Wan Hong, Gunpo-si (KR)

(73) Assignee: Nanobrick Co., Ltd., Suwon (KR)

( * ) Notice: Subject to any disclaimer, the term of this patent is extended or adjusted under 35 U.S.C. 154(b) by 0 days.

(21) Appl. No.: 13/813,953

(22) PCT Filed: Aug. 1, 2011

(86) PCT No.: PCT/KR2011/005648
§ 371 (c)(1),
(2), (4) Date: Apr. 9, 2013

(87) PCT Pub. No.: WO2012/018209
PCT Pub. Date: Feb. 9, 2012

(65) Prior Publication Data
US 2013/0293943 A1    Nov. 7, 2013

(30) Foreign Application Priority Data

Aug. 2, 2010  (KR) .................. 10-2010-0074776
Apr. 28, 2011  (KR) .................. 10-2011-0040411

(51) Int. Cl.
*G02B 26/00* (2006.01)
*G02F 1/09* (2006.01)
(Continued)

(52) U.S. Cl.
CPC ............... *G02F 1/09* (2013.01); *G02B 26/004* (2013.01); *G07D 7/04* (2013.01); *G07D 7/12* (2013.01);
(Continued)

(58) Field of Classification Search
CPC ........ Y10S 428/90; G07D 7/04; G11B 5/706; G11B 5/70605; G06K 7/084; G06K 1/125; B42D 2033/16; C09C 1/0081; B82Y 30/00; G02B 26/004; G02F 1/09; G02F 2001/094; G09F 9/37; G09F 9/375
USPC .......................... 235/435–449; 359/290–296; 428/98–206, 221–329, 900
See application file for complete search history.

(56) References Cited

U.S. PATENT DOCUMENTS 6,343,745 B1   2/2002  Bohm et al.
2012/0091699 A1*  4/2012  Krueger et al. ................. 283/67

FOREIGN PATENT DOCUMENTS

CN    1105127    7/1995
CN    101522317    9/2009
(Continued)

OTHER PUBLICATIONS

International Search Report, Korean Intellectual Property Office, Feb. 20, 2012.
(Continued)

*Primary Examiner* — Mahidere Sahle

(57) ABSTRACT

According to one embodiment of the present invention, a composite film comprising an indication area for preventing forgery is provided. The indication area comprises a magnetic solution distributed in a cured medium. The magnetic solution is a colloidal solution in which a plurality of magnetic particles charged in the same polarity are dispersed in a fluid, at least one of reflective light and transmittance of the magnetic solution changing when a magnetic field is applied, and an expressive material, of which a predetermined characteristic is expressed when specific energy is applied, is present separately from the magnetic solution in the cured medium.

16 Claims, 17 Drawing Sheets

200

(51) Int. Cl.
    *G07D 7/04*            (2006.01)
    *G07D 7/12*            (2006.01)
    *G02F 1/17*            (2006.01)
    *B42D 25/29*          (2014.01)

(52) U.S. Cl.
    CPC ............... *G02F 1/172* (2013.01); *B42D 25/29* (2014.01); *G02F 2001/094* (2013.01); *B42D 2033/16* (2013.01); *B42D 2035/20* (2013.01); *B42D 2035/34* (2013.01); *B42D 2033/30* (2013.01)
    USPC ........................................................ 359/296

(56) References Cited

FOREIGN PATENT DOCUMENTS

| | | |
|---|---|---|
| JP | 07-146659 | 6/1995 |
| JP | 09-071042 | 3/1997 |
| JP | 09-269513 | 10/1997 |
| KR | 10-1998-0059988 | 10/1998 |
| KR | 10-2007-0031309 | 3/2007 |

OTHER PUBLICATIONS

Written Opinion of the International Search Authority, Feb. 20, 2012.

\* cited by examiner

COMPOSITE FILM FOR PREVENTING FORGERY, AND COMPOSITE METHOD FOR PREVENTING FORGERY

PRIORITY

The present application claims priority under 35 U.S.C. §371 to PCT Application PCT/KR2011/005648, filed on Aug. 1, 2011, which claims priority to Korean Patent Application No. 10-2011-0040411, filed on Apr. 28, 2011, and to Korean Patent Application No. 10-2010-0074776, filed on Aug. 2, 2010, the disclosures of which are hereby incorporated by reference in their entireties.

TECHNICAL FIELD

The present invention generally relates to a technology for preventing forgery.

BACKGROUND ART

In general, various technologies for forgery prevention have been provided in order to prevent copied/forged products such as a generic drug, fake liquor, and counterfeit money. Conventional technologies for preventing forgery include a Moire pattern (an interference pattern with a wave pattern which is generated by overlapped dots or lines with geometrically regular distribution, if forgery is performed using a copying machine, a partial color change and a watered mark are generated due to an interference phenomenon), an intaglio press, a latent image (a printing technology in which cutting is performed by differentiating a direction of a printing area and a configuration of a part where there is no pattern so that a character or a pattern is hidden, and thus the character or the pattern appears in a certain direction or a method), an optically variable device (an element for preventing forgery in which a shape or a color changes depending on a viewing angle, such as hologram or Kinegram in a foreign banknote in which a shape and a pattern changes depending on the viewing angle), a watermark (as a motif or a character that appears by light and shade caused by thickness difference between a thin part and a thick part of a sheet for preventing forgery, a pattern such as a design and a letter which is viewed translucently or more darkly when a paper is viewed while being penetrated by bright light), and a security fiber (as a fine fiber inserted to a sheet, it has various functions that assign unique characteristics such as a color, a size, a property, a shape, an optical property, and a magnetic property, and is also used as a device sensing element).

However, a technique for preventing forgery incorporated with more complicated and various techniques have been required since the conventional technique is easily reproduced/forged by similar techniques. Therefore, the present invention introduces various characteristics in a complicated manner to enhance technology barriers against forgery, and achieves a method for manufacturing a composite film for preventing forgery that can be easily detected by a magnetic property without special analyzing equipment.

DETAILED DESCRIPTION OF THE INVENTION

Technical Problem

The object of the present invention is to provide a composite film for preventing forgery which is more complicated and difficult to copied, a composite film for preventing forgery and a method for manufacturing the same, a composite method for preventing forgery, and a composite set for preventing forgery.

Technical Solution

According to an aspect of the present invention, a composite film for preventing forgery including an indication area is provided in which the indication area includes a magnetic solution distributed in a cured medium, which is a material that is solidified in a fluid form by external energy and changes into a gel or a solid state, the magnetic solution is a colloidal solution in which a plurality of magnetic particles charged in the same polarity are dispersed in a fluid, at least one of reflective light and transmittance of the magnetic solution changing when a magnetic field is applied, and an expressive material, of which a predetermined characteristic is expressed when specific energy is applied, is present separately from the magnetic solution in the cured medium.

According to an aspect of the present invention, a method for manufacturing a composite film for preventing forgery is provided which includes steps of: mixing an expressive material that expresses a predetermined characteristic when specific energy is applied, into a liquid medium which is cured when specific energy is applied from outside; forming an emulsion by mixing the liquid medium and a magnetic solution, which is a colloidal solution in which magnetic particles charged in the same polarity are dispersed in a fluid and of which at least one of reflective light and transmittance changes when a magnetic field is applied to the magnetic solution; coating the emulsion on a substrate or a surface of a corresponding target; and curing only the liquid medium by applying external energy to the emulsion.

According to an aspect of the present invention, a composite method for preventing forgery is provided, which includes steps of: providing an indication area on a surface of a corresponding target, wherein the indication area includes a magnetic solution distributed in a cured medium, the magnetic solution is a colloidal solution in which magnetic particles charged in the same polarity are dispersed in a fluid, at least one of reflective light and transmittance of the magnetic solution changing when a magnetic field is applied, and an expressive material, of which a predetermined characteristic is expressed when specific energy out of various kinds of energy is applied, is present separately from the magnetic solution in the cured medium; firstly identifying at least one of a wavelength or transmittance of reflective light by applying an external magnetic field to the indication area; secondly identifying an expression characteristic of the expressive material by applying specific energy to the indication area; and determining authenticity of the corresponding target based on at least one of results obtained from the firstly identifying and the secondly identifying.

According to an aspect of the present invention, a computer-readable recording medium including a computer program that is run by a computer and executes instructions is provided, and the instruction includes a first instruction for identifying at least one of a wavelength or transmittance of reflective light by applying an external magnetic field to a target area of a corresponding target; a second instruction for identifying an expression characteristic of a expressive material by applying specific energy to the target area; and a third instruction for determining authenticity of the corresponding target based on at least one of results obtained from the firstly identifying and the secondly identifying.

According to an aspect of the present invention, a method for adjusting light transmission using magnetic particles is provided which includes applying a magnetic field to a plurality of magnetic particles in a state where the plurality of magnetic particles are dispersed in a solvent so that the plurality of particles are aligned in a direction parallel to a direction of the magnetic field, and controlling transmittance of light entering the plurality of particles and the solvent.

According to an aspect of the present invention, a film for adjusting light transmittance using magnetic particles includes a plurality of magnetic particles and a solvent in which the plurality of particles are dispersed, and when a magnetic field is applied to the plurality of particles in a state where the plurality of particles are dispersed in the solvent, the plurality of particles are aligned in a direction parallel to a direction of the magnetic field so that transmittance of light entering the plurality of particles and the solvent changes.

According to an aspect of the present invention, a device for displaying light transmission adjustment using magnetic particles includes the film for adjusting light transmittance; a unit for applying a magnetic field that applies a magnetic field to the film for adjusting light transmittance; and a unit for displaying visual information that displays visual information, and, if a magnetic field is applied to the plurality of particles in a state where the plurality of particles are dispersed in the solvent, the plurality of particles are aligned in a direction parallel to a direction of the magnetic field so that transmittance of light entering the plurality of particles and the solvent changes, and thus transmittance of the visual information displayed on the unit for displaying visual information with respect to the film for adjusting light transmittance is controlled.

According to an aspect of the present invention, a composite film for preventing forgery including an indication area is provided in which the indication area includes a magnetic solution distributed in a cured medium, which is a material which is solidified in a fluid form by external energy and changes into a gel or a solid state, the magnetic solution is a colloidal solution in which a plurality of magnetic particles charged in the same polarity are dispersed in a fluid, at least one of reflective light and transmittance of the magnetic solution changing when a magnetic field is applied, and an expressive material, of which a predetermined characteristic is expressed when specific energy is applied, is present separately from the magnetic solution in the cured medium. By applying a magnetic field to the magnetic solution, the plurality of particles are aligned in a direction parallel to the direction of the magnetic field, and thus transmittance of the light entering the indication area is controlled.

According to an aspect of the present invention, a method for preventing forgery by adjusting light transmittance using magnetic particles applies a magnetic field to the plurality of particles in a state where the plurality of magnetic particles are dispersed in the solvent so that the plurality of particles are aligned in a direction parallel to a direction of the magnetic field, and controls transmittance of light entering the plurality of particles and the solvent, and thus whether a product is forged or not is determined.

According to an aspect of the present invention, a film for preventing forgery using a film for adjusting light transmittance using magnetic particles includes a plurality of magnetic particles, and a solvent in which the plurality of particles are dispersed, and when a magnetic field is applied to the plurality of particles in a state where the plurality of magnetic particles are dispersed in the solvent, the plurality of particles are aligned in a direction parallel to a direction of the magnetic field so that transmittance of light entering the plurality of particles and the solvent changes, and thus whether a product is forged or not can be determined.

Advantageous Effects

A composite film for preventing forgery according to the present invention can effectively prevent forgery of a corresponding product.

According to the present invention, light transmittance may be adjusted in a simple way.

According to the present invention, a film for preventing forgery in which light transmittance changes can be provided.

BRIEF DESCRIPTION OF THE DRAWINGS

Other objects, advantages, and novel characteristics are clearly described with the following detailed description of the present invention in consideration with the accompanying drawings and claims.

MODE FOR CARRYING OUT THE INVENTION

Figure 1:
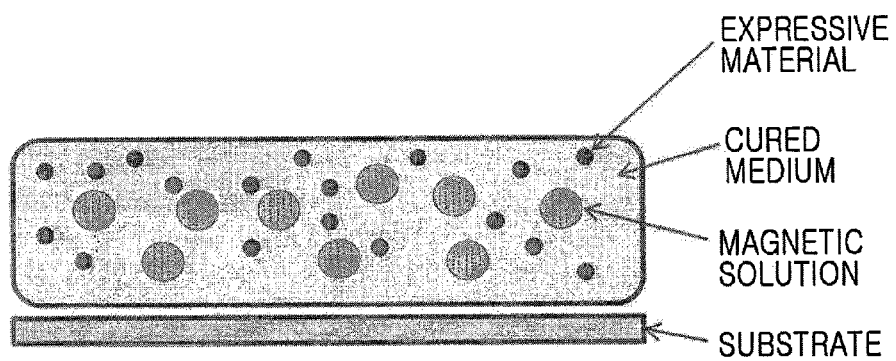
FIG. 1 is a drawing illustrating a composite film for preventing forgery according to an embodiment of the present invention.

The following detailed descriptions according to the present invention will be made with reference to the accompanied drawings illustrating certain exemplary embodiments by which the present invention can be practiced. The embodiments will be described in detail so that the present invention can be practiced by those skilled in the art. Various embodiments are different from each other, but it should be understood that the embodiments do not have to be mutually exclusive. For example, a specific form, structure, or characteristic according to an embodiment may be implemented by another embodiment without departing from the spirit or scope of the present invention. In addition, it should be understood that the position or disposition of each component in each embodiment can be changed without departing from the spirit or scope of the present invention. The expression used in the entire specification, "according to an embodiment" or "in an embodiment" does not mean that a form, structure, characteristic, type, configuration, or the like is applied to all of the embodiments. Further, it does not mean that a form, structure, characteristic, type, configuration, or the like is applied only to the specific embodiment. In addition, a form, structure, characteristic, type, configuration, or the like used in a specific embodiment can be combined with other embodiments.

In addition, a singular form of a noun used in the specification does not exclude the presence of a plural form. In addition, the terms "comprise," "have," "include" or their inflected words do not exclude the presence of components or steps other than components and steps previously described. In addition, the order of steps of a process used in the specification is not limited as described in the specification, but the steps of the process can be performed in another order. Ordinals used in the specification, such as "first", "second" "third" and the like are used only for differentiating components and steps from each other, but the ordinals do not have ordinal meanings.

Therefore, the detailed description described below is not intended to limit the present invention, but the scope of the present invention, if explained properly, is limited by the accompanied claims and the equivalents thereof. The similar reference numerals in the drawings denote the same or similar functions in various aspects.

Herein, in order to easily practice the present invention by those skilled in the art, the configuration of the present invention is described in detail with reference to the accompanied drawings.

Composite Film for Preventing Forgery

FIG. 1 is a drawing illustrating a composite film for preventing forgery according to an embodiment of the present invention. The composite film for preventing forgery may include an indication area formed on a substrate or a surface of a corresponding target. The indication area includes a magnetic solution distributed in a cured medium. The magnetic solution is a colloidal solution in which a plurality of magnetic particles charged in the same polarity are dispersed in a fluid, at least one of reflective light and transmittance of the magnetic solution changing when a magnetic field is applied, and an expressive material, of which a predetermined characteristic is expressed when specific energy is applied, is present separately from the magnetic solution in the cured medium.

Expression of Multiple Characteristics

The composite film for preventing forgery expresses multiple characteristics. For example, according to an embodiment of the present invention, a change of reflective light or transmittance of the magnetic solution and expression of certain characteristics of the expressive material can be used simultaneously or selectively.

In addition, according to an embodiment of the present invention, a material expressing a specific characteristic in addition to magnetic particles is mixed into a fluid of a magnetic solution so that the expression of characteristics by the magnetic particles of the magnetic solution, the expression by a characteristic expressing material of the magnetic solution, and the expression of a characteristic expressing material in a curing material can be used in a complex manner.

Emulsion Application

Meanwhile, according to an embodiment, after dispersing the magnetic solution into a liquid medium before being cured in an emulsion form, the indication area can be formed by applying external energy to the liquid medium and curing the liquid medium into a cured medium.

Encapsulation Application

According to an embodiment of the present invention, the indication area can be formed by encapsulating the magnetic solution with a light transmissive material, mixing the capsule into a liquid medium before being cured, applying external energy to the liquid medium, and curing the liquid medium into the cured medium.

Bank Application

According to an embodiment of the present invention, after a fine barrier structure is formed in the indication area, the magnetic solution is charged inside the fine barrier structure, the liquid medium is coated on the magnetic solution, and external energy is applied to a liquid medium, the liquid medium is cured into the cured medium to form the indication area. According to an embodiment, the fine barrier structure can be formed by patterning a curable material.

Gelation

According to an embodiment of the present invention, the liquid medium can be cured into a solid or gel form by applying external energy.

Magnetic Solution

According to an embodiment of the present invention, the magnetic solution may be hydrophilic, and the cured medium may be hydrophobic.

According to an embodiment of the present invention, the magnetic solution may be hydrophobic, and the cured medium may be hydrophilic.

Cured Medium

According to an embodiment of the present invention, external energy applied to the liquid medium can be thermal energy, light energy, electric energy, electromagnetic wave energy, kinetic energy, or a combination thereof.

According to an embodiment of the present invention, external energy applied to the liquid medium may be light energy in an ultraviolet region.

External energy applied to the liquid medium may be thermal energy equal to or lower than 300° C.

According to an embodiment of the present invention, the cured medium can be a composite film for preventing forgery that is reversibly phase-changed.

According to an embodiment of the present invention, the cured medium may include two or more solutions, and the cured medium can be cured by external energy, only when the solvent is mixed.

According to an embodiment of the present invention, the cured medium can be cured when the cured medium is in contact with the air.

According to an embodiment of the present invention, the cured medium can be cured when the cured medium is in contact with moisture.

According to an embodiment of the present invention, the cured medium can have permeability with respect to light in a visible light area.

Magnetic Solution

According to an embodiment of the present invention, the magnetic particles may include elements of Fe, Ni, or Co, or a combination thereof.

According to an embodiment of the present invention, a fluid in the magnetic solution may have permeability with respect to light in the visible light area.

According to an embodiment of the present invention, the magnetic solution may have a wavelength of reflective light that changes according to the application of external magnetic field.

According to an embodiment of the present invention, the magnetic particles may have magnetic polarization of which the amount changes when a magnetic field applied from outside changes.

According to an embodiment of the present invention, a fluid of the magnetic solution includes a thermosetting material, and thermal history can be measured using a characteristic that a magnetic property deteriorates when thermal energy is at a certain level or higher. Accordingly, external environmental information transmission and a memory function can be performed in addition to forgery determination according to the present invention.

According to an embodiment of the present invention, a fluid of the magnetic solution includes a photo-curing material, and light history can be measured using a characteristic that a magnetic property deteriorates when optical energy is at a certain level or higher. Accordingly, external environmental information transmission and a memory function can be performed in addition to forgery determination according to the present invention.

Principle of Operation of Magnetic Solution

Figure 2:
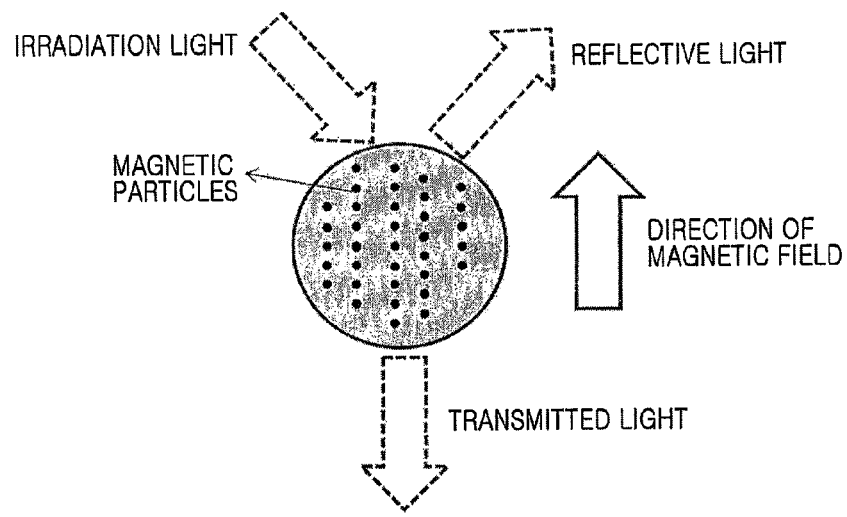
FIG. 2 is a diagram schematically illustrating a change of at least one of reflective light and transmittance when a magnetic field is applied to a magnetic solution according to an embodiment of the present invention.

FIG. 2 is a diagram schematically illustrating a change of at least one of reflective light and transmittance when a magnetic field is applied to a magnetic solution according to an embodiment of the present invention.

When an external magnetic field is applied to the magnetic solution, distances among magnetic particles are uniformly maintained by a balance between interaction force among magnetic particles due to magnetic polarization caused from particles and electric repulsive force among magnetic particles which are charged in the same polarity, and thus light on a wavelength corresponding to the distance can be reflected.

In addition, distances among the magnetic particles change depending on strength or a direction of an external magnetic field, and a wavelength of the reflected light changes corresponding to the change of the distances among the magnetic particles. Accordingly, displayed colors change.

According to an embodiment of the present invention, the magnetic particle includes a superparamagnet.

According to an embodiment of the present invention, when the external magnetic field is applied and transmittance of the magnetic solution changes, light transmittance can change as a degree of aligning the magnetic particles in a direction of the applied external magnetic field changes. In this case, the magnetic solution can include a magneto-rheological fluid. In addition, according to an embodiment, the magnetic particles may include ferromagnetic material.

Expressive Material

According to an embodiment of the present invention, the expressive material may express a specific characteristic by thermal energy, light energy, chemical energy, electric energy, electromagnetic wave energy, kinetic energy, or a combination thereof.

According to an embodiment of the present invention, the expressive material includes a fluorescent material, a phosphorescent material, a luminous material, or a combination thereof, and may emit light in a certain wavelength region by applying external light energy.

According to an embodiment of the present invention, the expressive material may be a quantum dot.

According to an embodiment of the present invention, the expressive material may include a material of which a color changes according to external thermal energy. According to an embodiment of the present invention, the expressive material may include a heat sensitive pigment or a heat sensitive dye.

According to an embodiment of the present invention, a color of the expressive material may change according to external moisture.

According to an embodiment of the present invention, a color of the expressive material may change according to an incidence angle or an observation angle of external irradiation light.

According to an embodiment of the present invention, the expressive material may include an OVP (optical variable pigment) material.

According to an embodiment of the present invention, the expressive material may include a micro element that indicates specific information with external electromagnetic wave energy.

According to an embodiment of the present invention, the micro element may include an RFID element, a Zigbee element, a Bluetooth element, or a combination thereof.

Film Configuration

According to an embodiment of the present invention, the composite film for preventing forgery further includes a substrate, and the indication area may be present on the substrate. According to an embodiment of the present invention, the substrate may be a flexible substrate. According to an embodiment of the present invention, the substrate may have light permeability.

According to an embodiment of the present invention, a surface opposite to the substrate can be laminated with a different layer so that the indication area can be interposed between the substrate and the different layer. The added different layer is for improvement of moisture proofing or a wear property.

The added different layer may have light permeability in the visible light area.

Method for Forming Specific Pattern

According to an embodiment of the present invention, a specific pattern is formed on the layer laminated on the surface of the indication area so that specific patterning may be performed on an area in which light transmittance and reflective light is presented.

According to an embodiment of the present invention, the magnetic solution may be formed into a specific pattern on the indication area.

According to an embodiment of the present invention, the cured medium may be formed into a specific pattern on the indication area.

According to an embodiment of the present invention, the expressive material may be formed into a specific pattern on the indication area.

According to an embodiment of the present invention, a fluid of the magnetic solution may form a specific pattern by curing a fluid of the magnetic solution only in a specific area of the film using a material that is cured with energy different from energy that cures the curing material.

Mixture Application Method

According to an embodiment of the present invention, a hologram material may be further included inside the indication area.

According to an embodiment of the present invention, the indication area can be formed into a pattern that includes specific information such as a barcode, a trademark logo, or the like.

Composite Set for Preventing Forgery

According to an embodiment of the present invention, a composite set for preventing forgery can be provided, which includes a composite film for preventing forgery as illustrated in FIG. 1 and a magnet that has a specific pattern and is attachable/detachable from the film.

According to an embodiment of the present invention, a composite set for preventing forgery can be provided, which includes a composite film for preventing forgery as illustrated in FIG. 1 and a magnet that has a specific magnetic polarity pattern and is attachable/detachable from the film.

Method for Manufacturing Composite Film for Preventing Forgery

Figure 3:
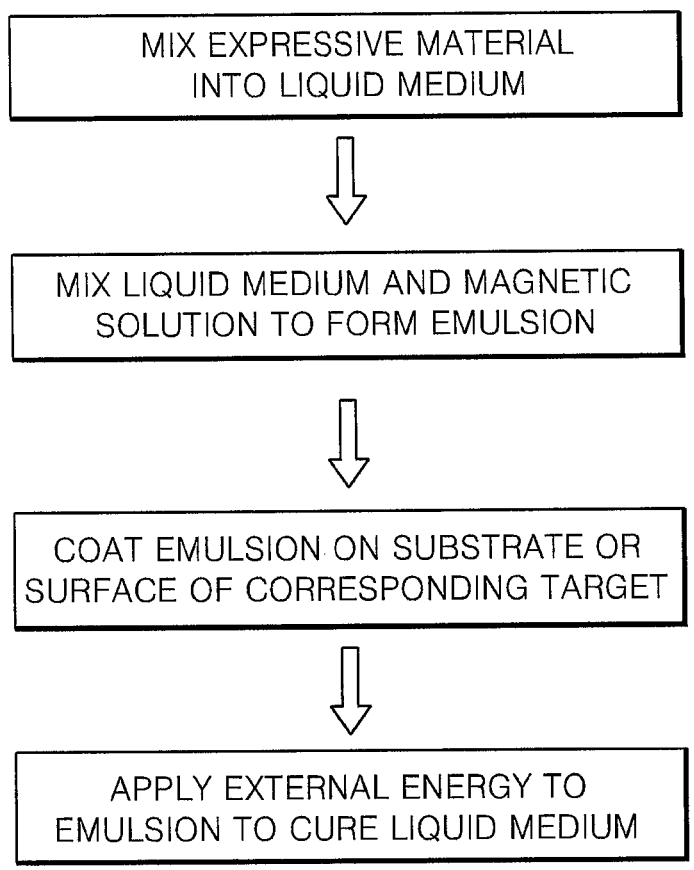
FIG. 3 is a flowchart illustrating a method for manufacturing a composite film for preventing forgery according to an embodiment of the present invention.

FIG. 3 is a flowchart illustrating a method for manufacturing a composite film for preventing forgery according to an embodiment of the present invention. According to an embodiment of the present invention, there is provided a method for manufacturing a composite film for preventing forgery. This method may comprises steps of: mixing an expressive material, which expresses a certain characteristic when specific energy is applied, into a liquid medium which is cured when specific energy is applied from outside; forming emulsion by mixing the liquid medium and a magnetic solution, which is a colloidal solution in which magnetic particles charged in the same polarity are dispersed in a fluid and of which at least one of reflective light and transmittance changes when the magnetic field is applied to the magnetic solution; coating the emulsion on a substrate or a surface of a corresponding target; and curing only the liquid medium by applying external energy to the emulsion.

According to an embodiment of the present invention, the coating may use at least one of a screen printing technique, an inkjet printing technique, and a gravure-offset technique.

According to an embodiment of the present invention, the coating may include applying the emulsion so that a specific pattern is formed on the substrate or the surface of the target.

According to an embodiment of the present invention, the mixing the expressive material into the emulsion may include disposing the expressive material in the emulsion so that the expressive material forms a specific pattern.

Composite Method for Preventing Forgery

Figure 4:
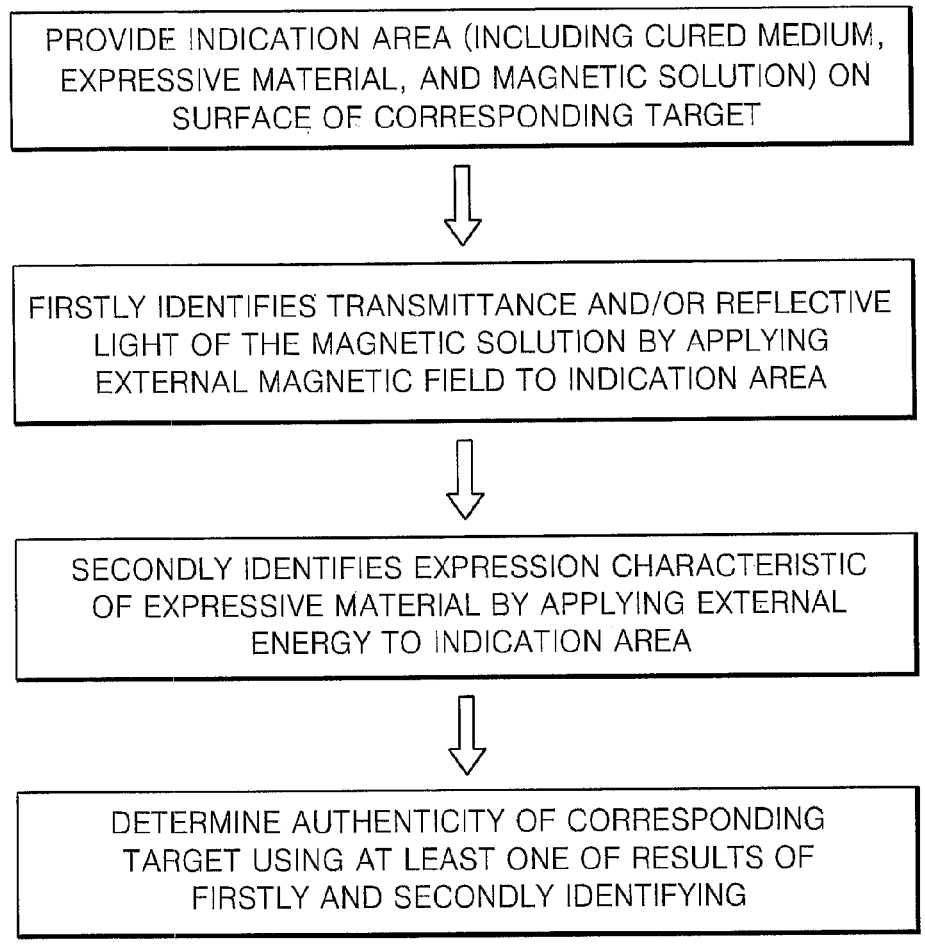
FIG. 4 is a flowchart illustrating a composite method for preventing forgery according to an embodiment of the present invention.

FIG. 4 is a flowchart illustrating a composite method for preventing forgery according to an embodiment of the present invention. According to an embodiment of the present invention, this method includes steps of providing an indication area on a surface of a corresponding target, wherein the indication area includes a magnetic solution distributed in a cured medium, the magnetic solution is a colloidal solution in which magnetic particles charged in the same polarity are dispersed in a fluid, at least one of reflective light and transmittance of the magnetic solution changing when a magnetic field is applied, and an expressive material, of which a predetermined characteristic is expressed when specific energy is applied, is present separately from the magnetic solution in the cured medium; firstly identifying at least one of a wavelength or transmittance of reflective light of the magnetic solution by applying an external magnetic field to the indication area; secondly identifying an expression characteristic of the expressive material by applying specific energy to the indication area; and determining authenticity of the corresponding target based on at least one of results obtained from the firstly identifying and the secondly identifying.

Targets for Applying Composite Technique for Preventing Forgery According to Present Invention An example for applying a composite technique for preventing forgery according to the present invention may be an alcoholic beverage, premium foodstuffs, paper money, a check, an identification (ID) card, a passport, a production number of a vehicle, an ID of a deluxe machine, a label of a premium product, a label of clothing, a label of a luxury bag, a product mark of software, a product number of a premium electronic product, or the like, but the example is not limited thereto.

Computer-Readable Recording Medium

According to an embodiment of the present invention, there is provided a computer-readable recording medium including a computer program that is run by a computer and executes instructions. The instructions may include a first instruction for identifying at least one of a wavelength or transmittance of reflective light by applying an external magnetic field to a target area of a corresponding target; a second instruction for identifying an expression characteristic of the expressive material by applying specific energy to the target area; and a third instruction for determining authenticity of the corresponding target based on at least one of results obtained from the firstly identifying and the secondly identifying.

According to an embodiment of the present invention, a composite film for preventing forgery as illustrated in FIG. 1 may be provided to the target area.

As to Method, Film, and Device for Adjusting Transmittance

First, a configuration of particles included in a film for adjusting light transmittance is described in detail as follows.

According to an embodiment of the present invention, the particles may have magnetism so that the particles can rotate or move by receiving magnetic force from a magnetic field, and a magnetic material such as nickel (Ni), iron (Fe), cobalt (Co) may be included in the particles.

In addition, according to an embodiment of the present invention, the particles may include a material that comes to have magnetism, i.e., to be magnetized, by applying a magnetic field. Especially, according to an embodiment of the present invention, in order to prevent a phenomenon that magnetic particles agglomerate together when a magnetic field is not applied from outside, a superparamagnetic material may be used in which magnetization occurs when an external magnetic field is applied but remanent magnetization does not occur when the external magnetic field is not applied.

In addition, according to an embodiment of the present invention, surfaces of the particles can be laminated with electrodes with the same polarity so that the particles are easily dispersed in a solvent and do not agglomerate together, and the surfaces of the particles may be laminated with a material with different specific gravity from the corresponding particles or a material with different specific gravity from the corresponding particles may be mixed into the solvent so that the particles are not precipitated in the solvent.

In addition, according to an embodiment of the present invention, the particles may be configured to reflect light of a specific wavelength, i.e., to have a specific color. To be more specific, the particles according to the present invention may have a specific color by adjusting an oxidation number or laminating an inorganic pigment, a pigment, or the like. For example, as an inorganic pigment laminated on the particles according to the present invention, Zn, Pb, Ti, Cd, Fe, As, Co, Mg, Al, or the like including a chromophore group may be used in a form of an oxide, a sulfide, and a lactate, and as a dye laminated on the particles according to the present invention, a fluorescent dye, an acid dye, a basic dye, a mordant dye, a sulfide dye, a vat dye, a disperse dye, reactive dye, or the like may be used.

In addition, the particles according to an embodiment of the present invention may include a material having a structural color by a photonic crystal. To be more specific, the particles may be a material expressing a structural color by a photonic crystal on which magnetic particles are laminated or a material including magnetic particles, or a mixture of magnetic particles and particles having a structural color. Since particles having a photonic crystal structure may express different structural colors depending on a viewing angle, photonic crystal particles moves by the arrangement of the magnetic particles as the magnetic field is applied, and thus different structural colors can be expressed.

In addition, according to an embodiment of the present invention, silica, macromolecules, macromolecule monomers, or the like can be laminated on surfaces of the particles so that the particles have higher dispersibility and stability in a solvent.

Meanwhile, diameters of the particles according to the present invention may be tens of nanometers to tens of micrometers, but the diameters are not limited thereto.

Subsequently, the configuration of a solvent included in the film for adjusting light transmittance according to the present invention is described in detail as follows.

According to an embodiment of the present invention, the solvent may be configured with a material having a similar specific gravity with the particles so that the particles are uniformly dispersed, and configured with a material that is appropriate for the particles to be stably dispersed in the solvent. For example, the solvent may include halogen carbon oil, dimethyl silicon oil, or the like that has a low dielectric constant.

In addition, according to an embodiment of the present invention, the solvent may be configured to reflect light of a specific wavelength, i.e., to have a specific color. To be more specific, the solvent according to the present invention may include a material having an inorganic pigment or dye, or a material having a structural color according to a photonic crystal.

In addition, according to an embodiment of the present invention, the magnetic particles are prevented from agglomerating together or being attached to inner walls of a capsule in an encapsulation process, by uniformly dispersing the magnetic particles in a fat-soluble solvent.

However, the configuration of the particles and the solvent according to the present invention are not limited as described above, and can be appropriately changed within the scope in which the object of the present invention can be achieved.

Subsequently, the configuration in which the particles and a solvent included in the film for adjusting light transmittance according to the present invention are encapsulated or partitioned are described in detail as follows.

According to an embodiment of the present invention, the particles are encapsulated into a plurality of capsules including a light permeable material in a state where the particles are dispersed in the solvent. According to an embodiment of the present invention, by encapsulating the particles and the solvent, the generation of direct interference such as inclusion among capsules different from each other can be prevented, and accordingly particles included in the film for adjusting light transmittance can be controlled independently from capsule to capsule. As a result, light transmittance can be adjusted into more various patterns, and the characteristics for controlling light transmittance can be enhanced.

For example, as a material that configures a capsule according to an embodiment of the present invention, gelatin, acacia, melamine, urea, protein, polysaccharide, or the like may be used, and a material for fixing a capsule in the film for adjusting light transmittance (i.e., a binder) can be used. However, the configuration of the capsule according to the present invention is limited to the examples as listed above, and any material which is light permeable, physically strong, not hard, elastic, not porous, and resistant to external heat and pressure can be used as a material of the capsule according to the present invention.

In addition, according to an embodiment of the present invention, the particles are partitioned in a state where the particles are dispersed in the solvent. According to an embodiment of the present invention, the generation of direct interference such as inclusion among cells different from each other which are partitioned by barriers can be prevented, and accordingly particles included in the film for adjusting light transmittance can be controlled independently from capsule to capsule.

FIGS. 5 to 9 are diagrams illustrating exemplary configurations and operating principles of a film for adjusting light transmittance according to an embodiment of the present invention. For reference, FIGS. 5 to 9 illustrate any one of a plurality of capsules included in a film for adjusting light transmittance, but the features illustrated in FIGS. 5 to 9 can be applied to other capsules included in the film for adjusting light transmittance in the same manner.

With reference to FIGS. 5 to 9, a film 100 for adjusting light transmittance according to an embodiment of the present invention may include a plurality of magnetic particles 110, a solvent 120, and a capsule 130, and the capsule 130 may include the plurality of magnetic particles 110 in a state of being dispersed in the solvent 120.

Figure 5:
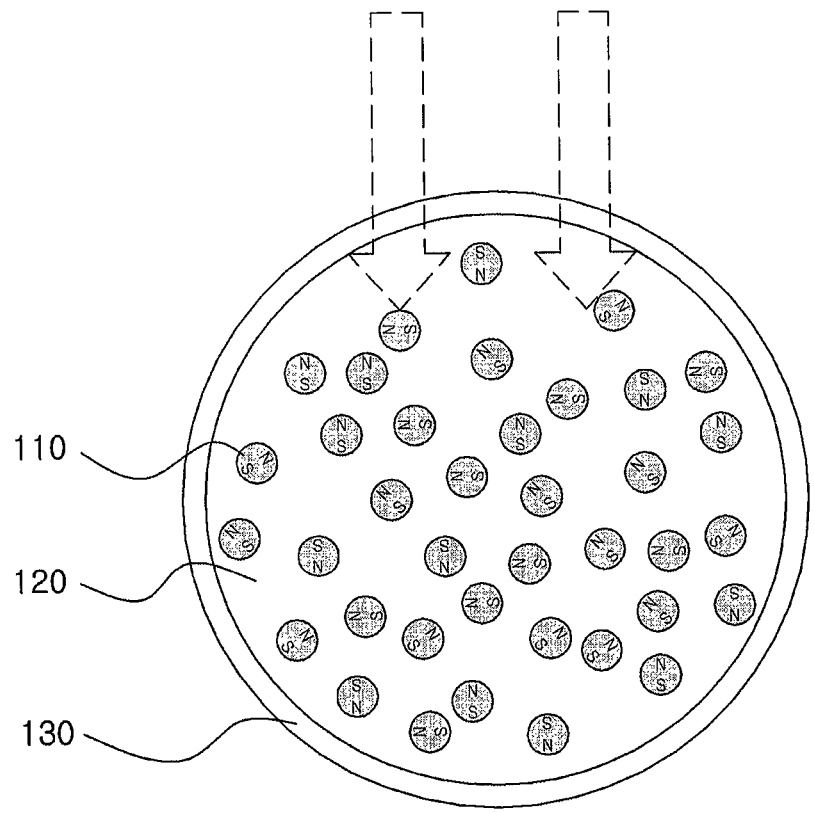
FIGS. 5 to 9 are diagrams illustrating exemplary configurations and operating principles of a film for adjusting light transmittance according to an embodiment of the present invention.

First, with reference to FIG. 5, when a magnetic field is not applied to the film 100 for adjusting light transmittance, the plurality of magnetic particles 100 can be irregularly dispersed in the capsule 130, and in this case, the transmittance of light that enters the film 100 for adjusting light transmittance is not specifically controlled. That is, the light that enters the film 100 for adjusting light transmittance is scattered or reflected by the plurality of particles 110 irregularly dispersed in the capsule or the solvent 120 or transmits the film 100 for adjusting light transmittance.

In an embodiment of FIG. 5, a case in which superparamagnetic particles which do not present remanent magnetization values after an external magnetic field is blocked are used as magnetic particles is illustrated. However, it is also possible to apply to a case in which the remanent magnetization values remains after an external magnetic field is blocked, and this case will be described in more detail with respect to FIG. 6 described below.

Subsequently, with reference to FIGS. 6 to 8, when a magnetic field is applied to films 200, 300, and 400 for adjusting light transmittance, a plurality of magnetic particles 210, 310, and 410 in capsules 230, 330, and 430 can be aligned in a direction parallel to a direction of the magnetic field, and accordingly the transmittance of light that enters the films 200, 300, and 400 for adjusting light transmittance can be controlled.

To be more specific, when the magnetic field is applied to the films 200, 300, and 400 for adjusting light transmittance according to an embodiment of the present invention, each of the plurality of particles 210, 310, and 410 can rotate or move so that directions from the S-poles to the N-poles of the plurality of particles 210, 310, and 410 are the same as the direction of the magnetic field. In addition, according to an embodiment of the present invention, when the magnetic field is applied to the films 200, 300, and 400 for adjusting light transmittance, the plurality of particles 210, 310, and 410 can be magnetized by the magnetic field, and each of the plurality of magnetized particles 210, 310, and 410 can rotate or move so that the magnetization direction is the same as the direction of the magnetic field.

Since the N-poles and S-poles of each of the particles 210, 310, and 410, which are rotated or moved, respectively come close to the S-poles and N-poles of the neighboring particles 210, 310, and 410, magnetic pull force or push force is generated among the plurality of particles 210, 310, and 410. Accordingly, the plurality of particles 210, 310, and 410 can be regularly aligned in a direction parallel to the direction of the magnetic field.

Figure 6:
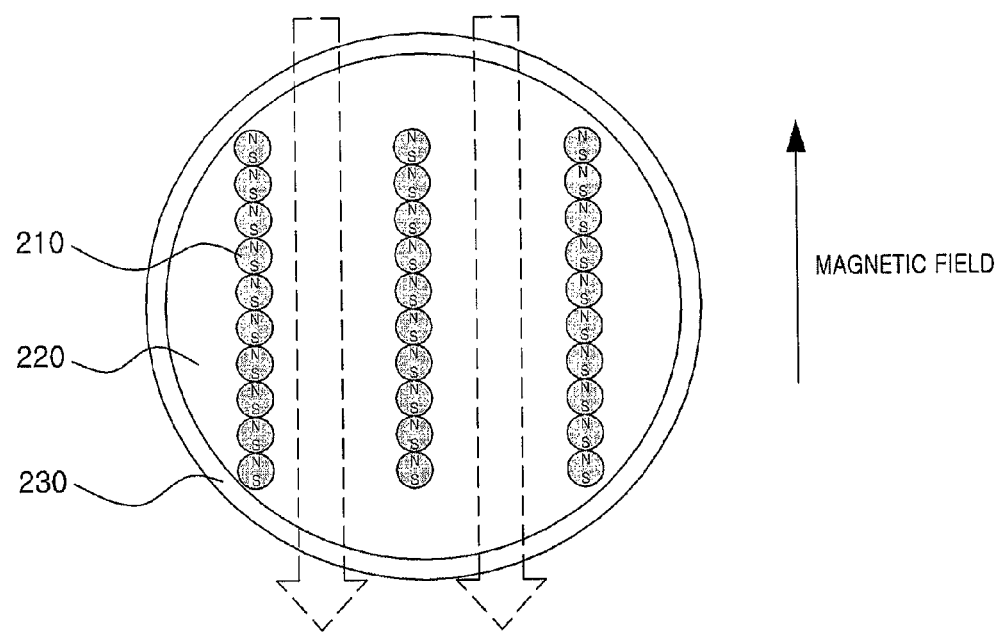
Figure 7:
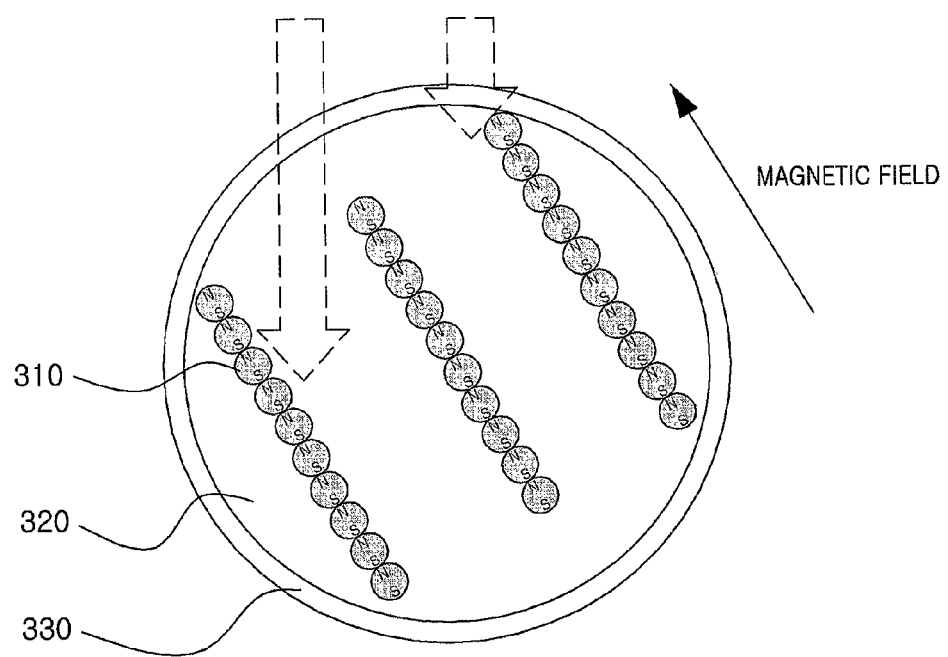
Figure 8:
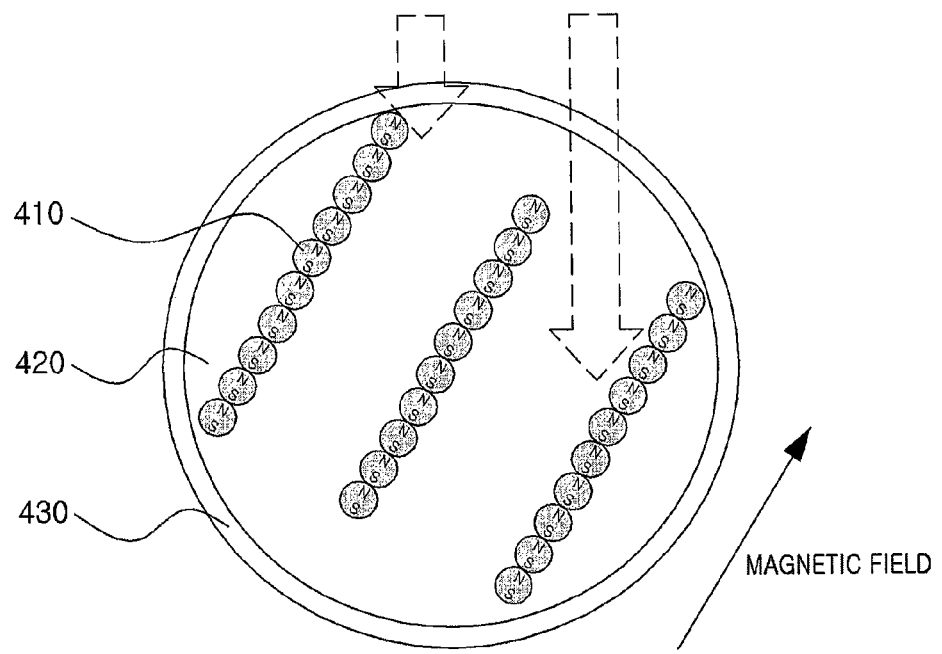

Meanwhile, FIGS. 6 to 8 merely illustrate embodiments in which the plurality of particles 210, 310, and 410 form a chain of a straight line form, but the configuration of the films 200, 300, and 400 for adjusting light transmittance according to the present invention is not limited thereto, and the plurality of particles 210, 310, and 410 may interact to form various shapes including a composite chain shape.

Subsequently, with reference to FIGS. 6 to 8, the plurality of particles 210, 310, and 410 which are regularly aligned in a direction parallel to the direction of the magnetic field can change the transmittance of light that enters the films 200, 300, and 400 for adjusting light transmittance according to the alignment direction. To be more specific, when the alignment direction of the particles 210 is parallel to the direction of the incident light as illustrated in FIG. 6, it is less likely that the incident light is reflected or scattered by the particles 210, and thus the transmittance of the incident light can be relatively enhanced. However, as illustrated in FIGS. 7 to 8, when the alignment directions of the particles 310 and 410 are not parallel to the direction of the incident light and form angles with the direction of the incident light, it is relatively more likely that the incident light is reflected or scattered by the particles 310 and 410 so that the transmittance of the incident light may be relatively low.

Figure 9:
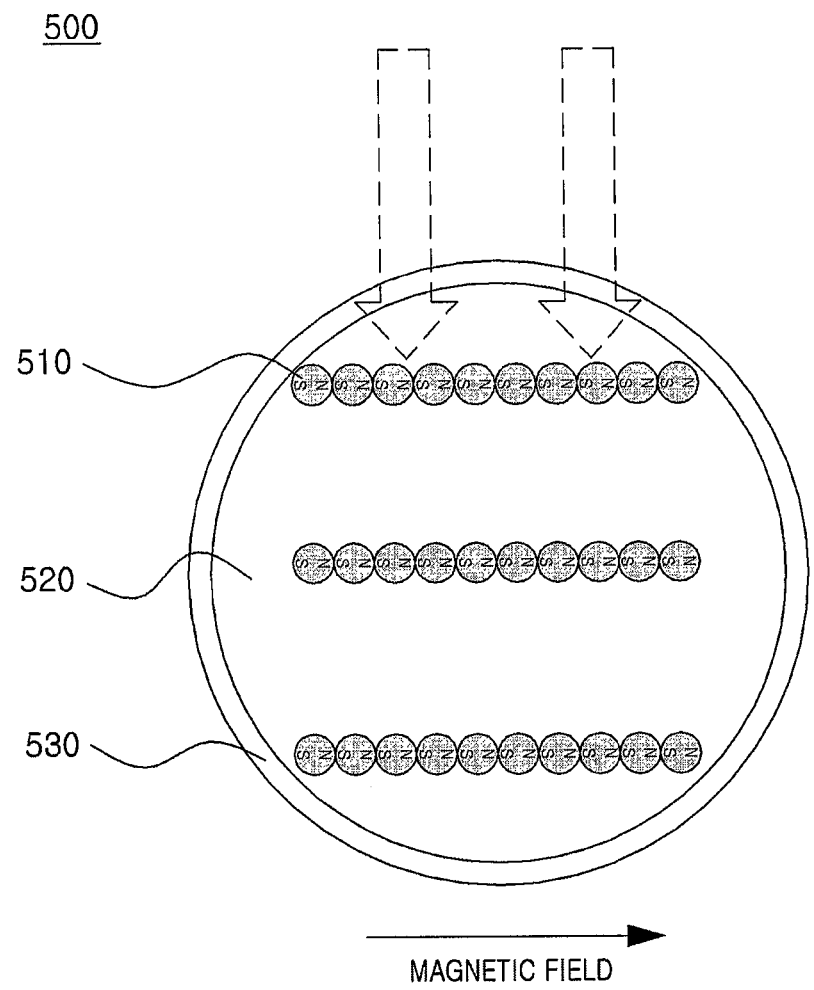

Subsequently, with reference to FIG. 9, when the direction of the magnetic field forms a right angle with the direction of the incident light, the incident light is blocked by the plurality of particles 510 arranged in the direction forming a right angle with the magnetic field, and thus the transmittance of the incident light can be minimized in comparison with the cases of FIGS. 1 to 4. That is, as illustrated in FIG. 5, when the alignment direction of the plurality of particles 510 is perpendicular to the direction of the incident light, it is highly likely that the incident light is reflected or scattered by the particles 510.

Meanwhile, when the plurality of particles have residual magnetic polarity like a superparamagnetic material, the plurality of particles can be uniformly arranged due to magnetic pull/push force among the particles when the applied magnetic field is blocked. Particularly, the alignment direction can be perpendicular to the direction of the incident light. The alignment state may be as illustrated in FIG. 9. That is, when the plurality of particles have residual magnetic polarity, the particles to which the magnetic field is applied may maintain the state of being uniformly aligned due to the remanent magnetization phenomenon when the magnetic field is blocked, and afterwards when the magnetic field is applied again, the alignment direction can be changed. Accordingly, the light transmittance of the film for adjusting light transmittance can be adjusted.

Meanwhile, according to an embodiment of the present invention, by adjusting viscosity of the solvent, specific gravities of the particles and the solvent, the additive, and the like, the state and the alignment direction where the plurality of magnetic particles are arranged in a straight line formed by the magnetic field, can be maintained as they are even when the magnetic field applied to the film for adjusting light transmittance is blocked. In addition, according to an embodiment of the present invention, by using a material that performs phase-change according to external stimulation (light, temperature, pressure, humidity, and the like) as a solvent, even when the magnetic field applied to the film for adjusting light transmittance is blocked, the plurality of magnetic particles can maintain the state and the arrangement direction where the plurality of magnetic particles are aligned in a straight line form by the magnetic field.

Figure 10:
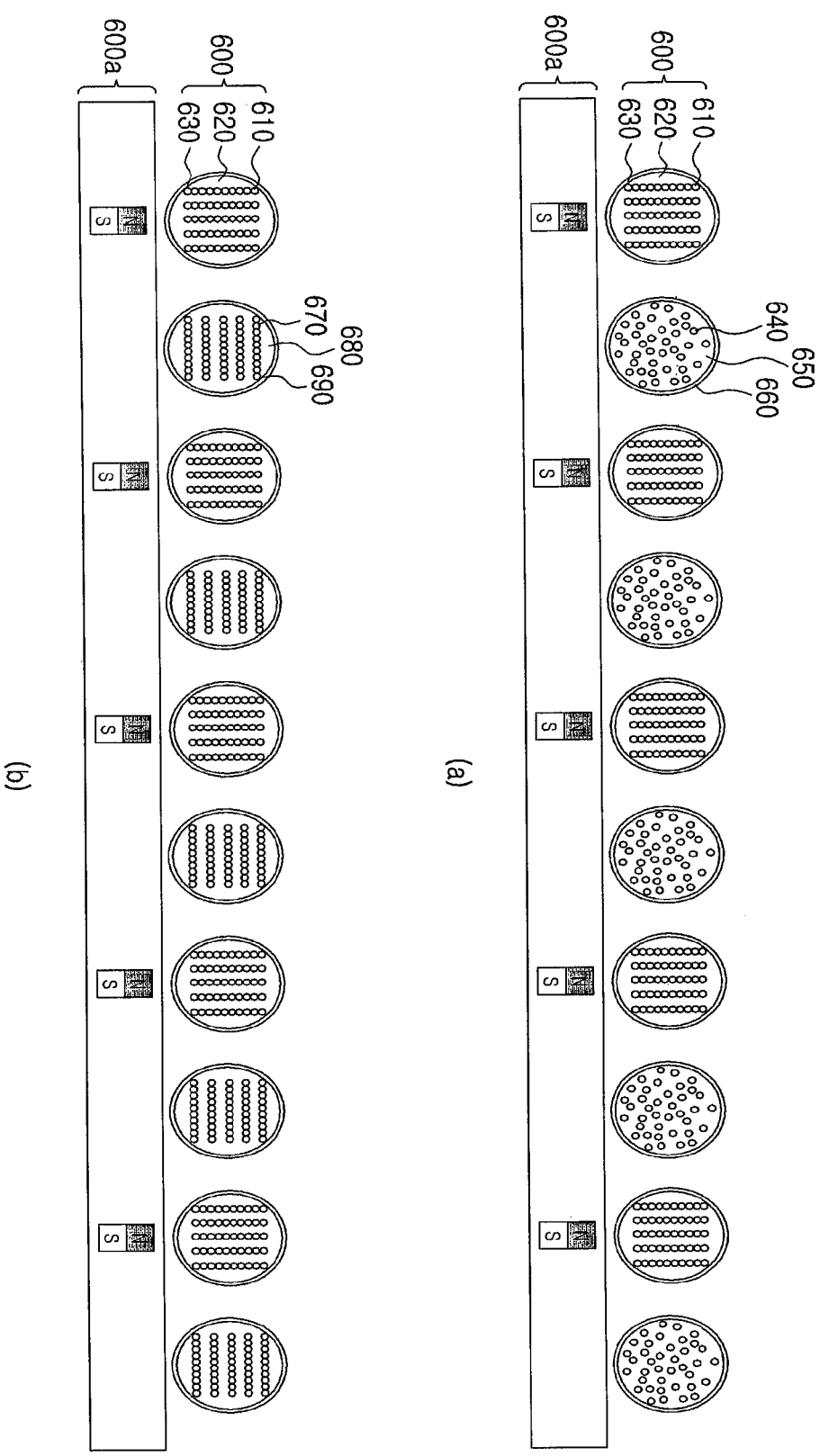
FIGS. 10A and 10B are diagrams illustrating exemplary configurations of applying the magnetic field to a film for adjusting light transmittance in a predetermined pattern according to an embodiment of the present invention.

FIGS. 10A and 10B are diagrams illustrating exemplary configurations of applying the magnetic field to a film for adjusting light transmittance in a predetermined pattern according to an embodiment of the present invention.

With reference to FIGS. 10A and 10B, it is assumed that films 600 for adjusting light transmittance according to the present invention are positioned on magnetic field generation units 600a that generate magnetic fields in predetermined patterns. Here, the magnetic field generation units 600a may repeatedly include areas in which magnetic fields are generated and areas in which magnetic fields are not generated at a certain interval, a magnetic field of an upward direction may be generated in an area for generation of the magnetic field, and the magnetic field generation units 600a may be combined with the films 600 for adjusting light transmittance, in some cases.

To be more specific, according to an embodiment of the present invention, if particles (for example, particles including a superparamagnetic material) in which a remanent magnetization phenomenon is not presented are used as magnetic particles in films 600 for adjusting light transmittance, in capsules 630 positioned in parts of the films 600 for adjusting light transmittance where the magnetic fields are applied, particles 610 are aligned in a direction parallel to a direction of the magnetic field, and thus the transmittance of the light entering in a direction parallel to a direction of the magnetic field increases. On the contrary, in capsules 660 positioned in parts of the films 600 for adjusting light transmittance where the magnetic fields are not applied, particles 640 are irregularly dispersed, and thus the transmittance of the light entering, in a direction parallel to a direction of the magnetic field may not be relatively high (see FIG. 10A).

Subsequently, according to an embodiment of the present invention, when, as magnetic particles in the films 600 for adjusting light transmittance, if particles that present a remanent magnetization phenomenon (for example, particles including a ferromagnetic material) are used in capsules 630 positioned in parts of the films 600 for adjusting light transmittance where the magnetic fields are applied, particles 610 are aligned in a direction parallel to a direction of the magnetic field, and thus the transmittance of light entering in a direction parallel to a direction of the magnetic field increases. On the contrary, in capsules 690 positioned in parts of the films 600 for adjusting light transmittance where the magnetic fields are applied and then blocked, particles 670 maintain a state of being aligned in a straight line shape and are arranged so that the alignment direction is parallel to the film (i.e., perpendicular to a direction of the incident light), and thus the transmittance of light entering in a direction parallel to the magnetic field can be minimized. Accordingly, in the film 600 for adjusting light transmittance, a difference of transmittance between parts where the magnetic field is applied and parts where the magnetic field is not applied may be large (see FIG. 10B).

As described above, various applications may be implemented by using a configuration in which light transmittance is adjusted by applying an external magnetic field to a film for adjusting light transmittance according to the present invention.

First, according to an embodiment of the present invention, as described above, particles or a solvent included in a film for adjusting light transmittance may have a specific color. Accordingly, when light transmittance of the film for adjusting light transmittance increases, it is possible to present the color of the particles or the solvent included in the film for adjusting light transmittance.

In addition, according to an embodiment of the present invention, inside or under the film for adjusting light transmittance, a material that reacts with light that enters from outside such as a fluorescent material, phosphor material, or a luminous substance is included so that a characteristic of a light adjustment film can be expressed in a dark place according to a magnetic field.

In addition, according to an embodiment of the present invention, by including a photonic crystal material inside the film for adjusting light transmittance, it is possible to implement a configuration in which a color changes depending on an external viewing angle and light transmittance is adjusted according to an external magnetic field.

In addition, according to an embodiment of the present invention, by including a light crystal material inside the film for adjusting light transmittance and applying an external magnetic field to change a position and a direction of a light crystal material, it is possible to implement a configuration in which light transmittance and a wavelength of reflective light is adjusted according to the external magnetic field.

In addition, according to an embodiment of the present invention, by adjusting not only an alignment direction of magnetic particles included inside the film for adjusting light transmittance but also a distance among the particles, it is possible to implement a configuration in which light transmittance and a wavelength of reflective light are adjusted.

In addition, according to an embodiment of the present invention, by enabling an alignment state of particles included inside the film for adjusting light transmittance to be adjusted not only by a magnetic field but also by an electric field, it is possible to implement a configuration in which light transmittance can be adjusted by using both a magnetic field and an electric field.

In addition, according to an embodiment of the present invention, by enabling magnetic particles in the film for adjusting light transmittance to include a material of which a color changes according to a temperature, it is possible to implement a configuration in which light transmittance is adjusted according to a magnetic field and a color changes according to a temperature.

In addition, according to an embodiment of the present invention, a capsule that performs a function for adjusting light transmittance with respect to a part of the film for adjusting light transmittance can be formed in a predetermined pattern using a process such as screen printing, gravure-offset, and accordingly various films for adjusting light transmittance such as a barcode, a character, a diagram, and a logo, which are presented only when a magnetic field is applied, can be implemented.

In addition, according to an embodiment of the present invention, by applying a magnetic field with a specific pattern to a film for adjusting light transmittance, it is possible to implement a configuration in which a light transmittance area in a specific pattern corresponding to the specific pattern of the magnetic field on the film for adjusting light transmittance is formed.

In addition, according to an embodiment of the present invention, by positioning a film for adjusting light transmittance on a background with a specific form, color, or pattern under a light adjustment film and adjusting light transmittance of the film for adjusting light transmittance, it is possible to implement a configuration in which whether to present the specific form, color, or pattern of the background can be dynamically controlled.

In addition, according to an embodiment of the present invention, by using a film for adjusting light transmittance of which a light transmittance pattern changes according to an external magnetic field, in addition to a light switch, a tag or an advertisement promotion indicator for preventing forgery or the like may be implemented. That is, by using a method and a film for continuously adjusting transmittance according to the present embodiment, forgery can be easily identified. In other words, when a film according to the present invention is attached to a surface of a paper money or a premium alcoholic beverage and then a magnet is put close in order to identify forgery of the corresponding product, it is possible to determine whether the transmittance changes continuously.

Examination Result

Figure 11:
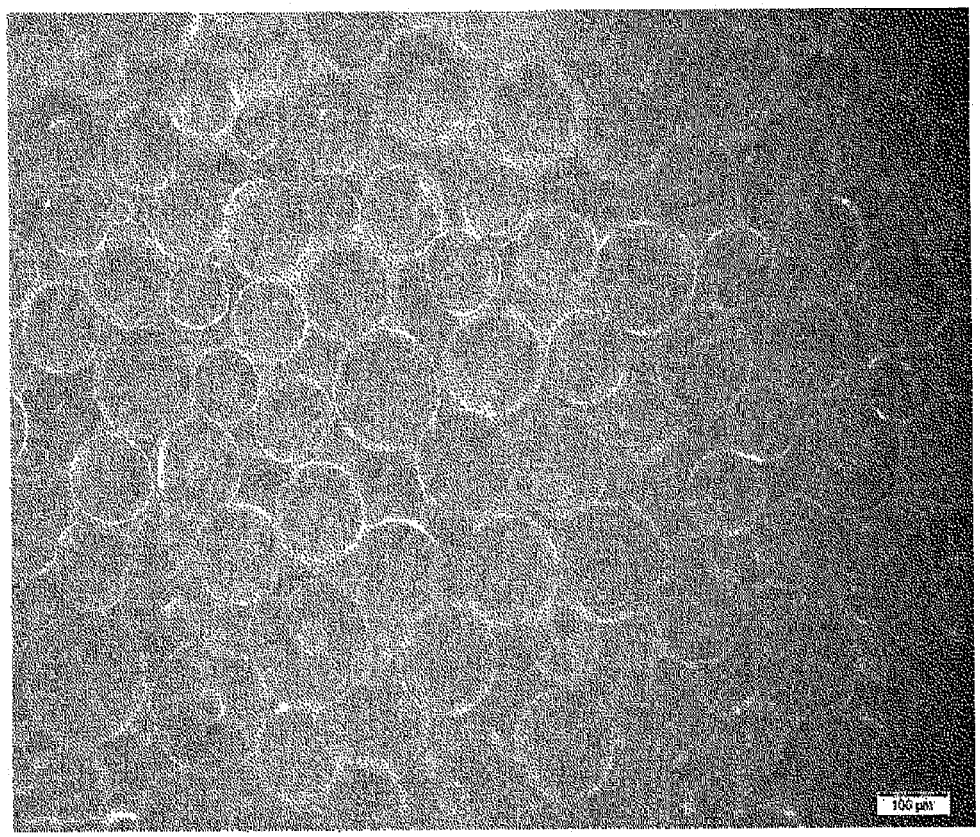
FIGS. 11 to 13 are pictures illustrating results obtained by performing experiments of applying a magnetic field in a state where magnetic particles are dispersed in a solvent according to an embodiment of the present invention.
Figure 12:
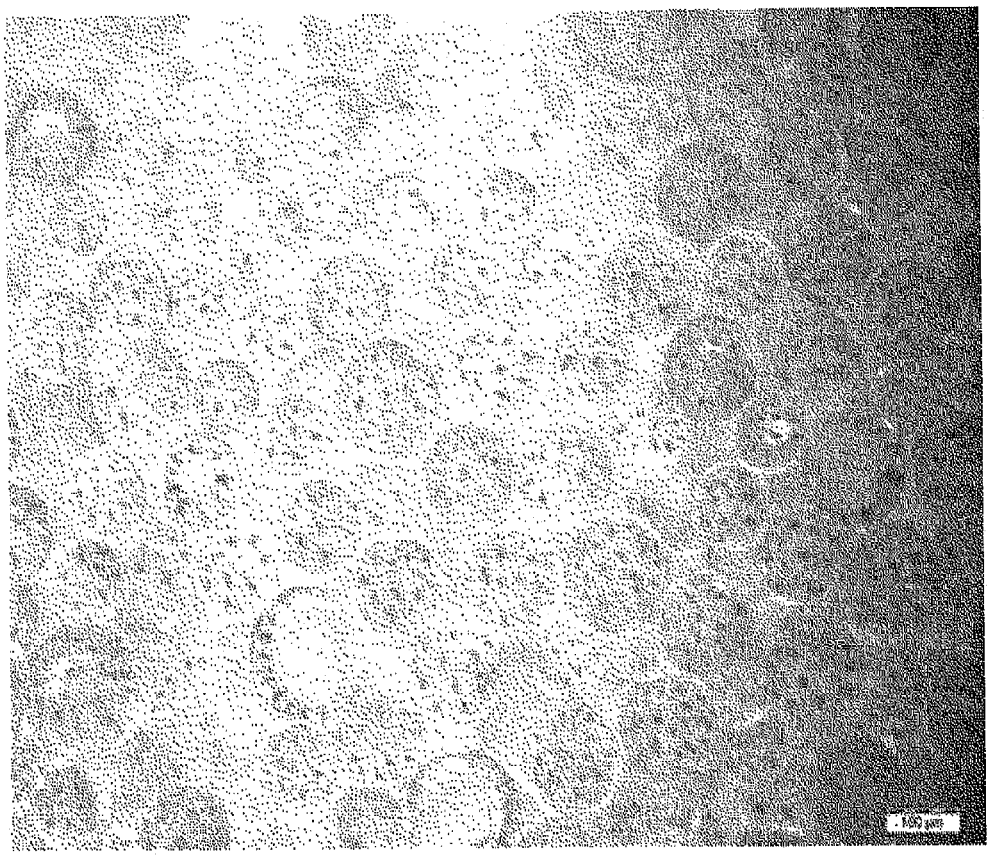
Figure 13:
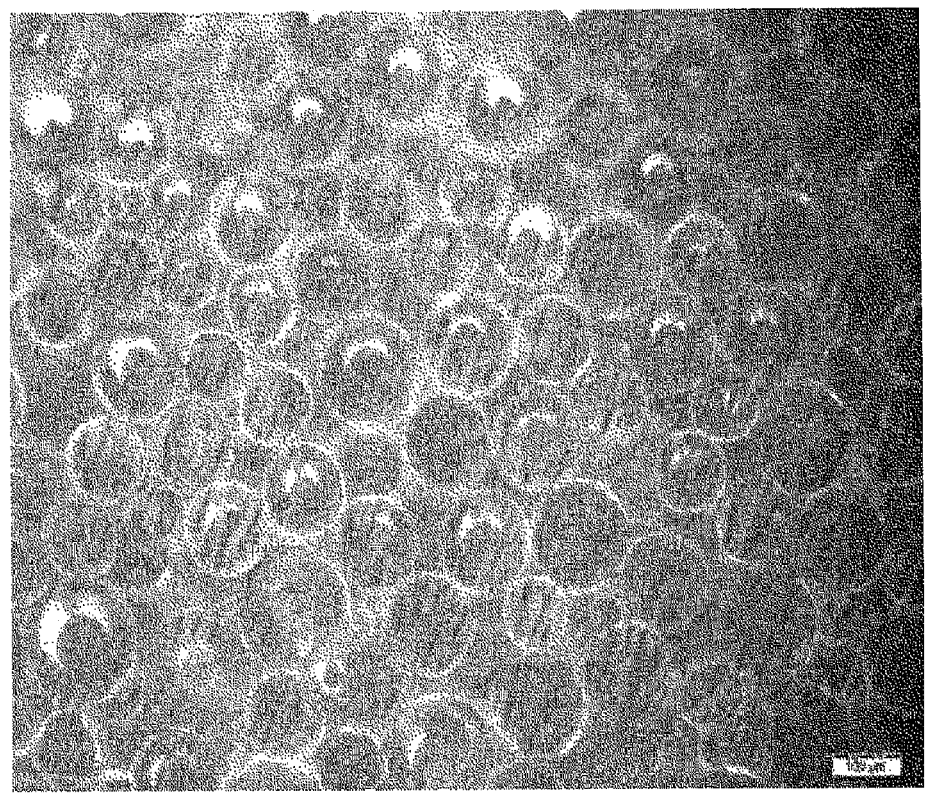

FIGS. 11 to 13 are pictures illustrating results obtained by performing experiments of applying a magnetic field in a state where magnetic particles are dispersed in a solvent according to an embodiment of the present invention. For reference, in the experiments of FIGS. 11 to 13, iron oxide particles ($FeO_x$) of 10 nm to 10 um are used as magnetic particles, halogenated hydrocarbon oil is used as a solvent, and a compound including gelatin is used as a capsule.

First, with reference to FIG. 11, when a magnetic field is not applied to a film for adjusting light transmittance, it is confirmed that particles in capsules are irregularly scattered. Accordingly, it is confirmed that transmittance of incident light is presented in the middle range between the results of FIGS. 12 and 13 (corresponding to FIG. 5). Subsequently, with reference to FIG. 12, when a magnetic field is applied to a film for adjusting light transmittance in a direction perpendicular to a film surface, it is confirmed that particles in capsules are aligned in a direction parallel to a direction of the magnetic field (the direction perpendicular to the film surface) (in FIG. 12, a plurality of particles which are aligned in a straight line form are observed in a dotted form). Accordingly, it is confirmed that transmittance of light entering in a direction parallel to the direction of the magnetic field becomes relatively high. Subsequently, with reference to FIG. 13, due to a remanent magnetization phenomenon presented by particles in capsules when a magnetic field applied to a film for adjusting light transmittance is blocked, it is confirmed that the particles are arranged in a direction parallel to the film for adjusting light transmittance by interaction of aligned particles with maintaining an alignment state in a straight line form (in FIG. 13, a plurality of particles aligned in a straight line form are observed in a stick form). Accordingly, it is confirmed that transmittance of light entering in a direction parallel to a direction of the magnetic field becomes relatively low.

Figure 14:
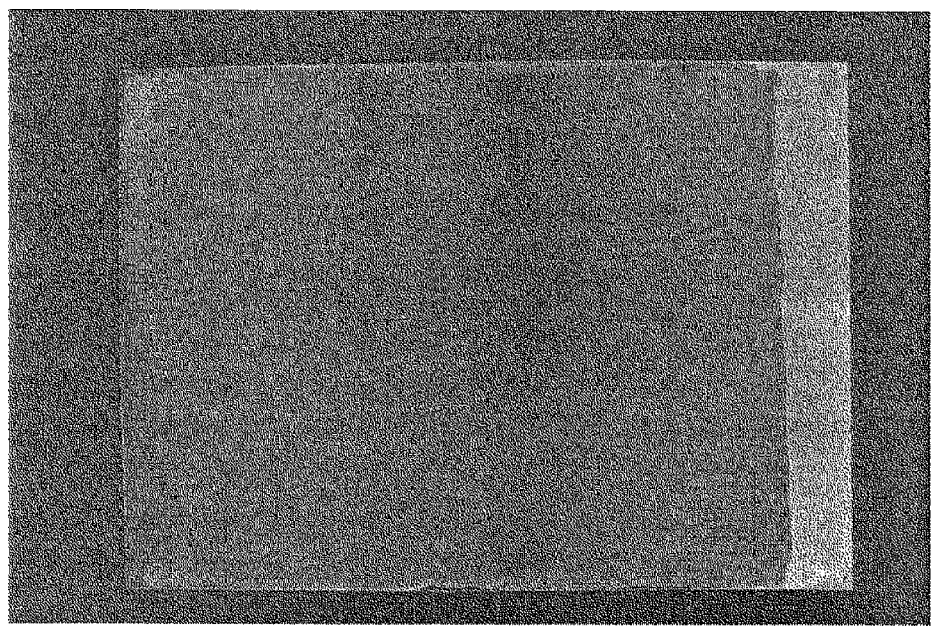
FIGS. 14 to 15 are pictures illustrating results obtained by performing experiments of applying a magnetic field in a predetermined pattern to a film for adjusting light transmittance according to an embodiment of the present invention.
Figure 15:
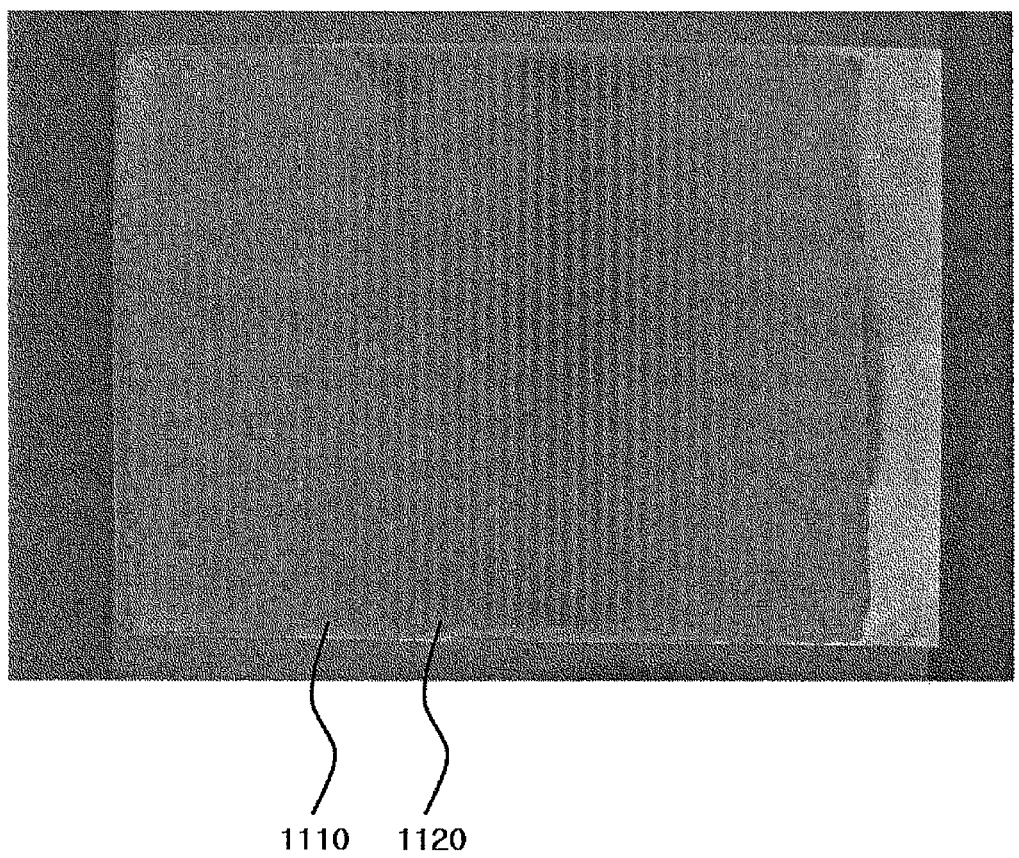

FIGS. 14 to 15 are pictures illustrating results obtained by performing experiments of applying a magnetic field in a predetermined pattern to a film for adjusting light transmittance according to an embodiment of the present invention. For reference, in the experiments of FIGS. 14 to 15, iron oxide particles ($Fe_2O_3$ or $Fe_3O_4$) of 10 nm to 10 um are used as magnetic particles, halogenated hydrocarbon oil is used as a solvent, and a mixture of gelatin and an acacia aqueous solution is used as a capsule.

First, with reference to FIG. 14, throughout the film for adjusting light transmittance when a magnetic field is not applied to the film for adjusting light transmittance, it is confirmed that transmittance of the incident light is uniformly presented without a great difference. Subsequently, with reference to FIG. 14, when a film for adjusting light transmittance is put on a magnetic field application portion where areas in which a magnetic field (i.e., a magnetic field applied in a direction perpendicular to a light transmission adjustment film) is generated and areas in which a magnetic field is not generated are repeatedly arranged with a predetermined interval, in a part 1110 of the film for adjusting light transmittance where a magnetic field is applied, particles are aligned in a direction parallel to a direction of the magnetic field, and thus it is confirmed that the transmittance of light entering in a direction parallel to a direction of the magnetic field is high (i.e., transparent). In a part 1120 of the film for adjusting light transmittance where a magnetic field is not applied, particles are not aligned in a direction parallel to a direction of the magnetic field, and thus it is confirmed that the transmittance of light entering in a direction parallel to a direction of the magnetic field is low (i.e., opaque).

Figure 16:
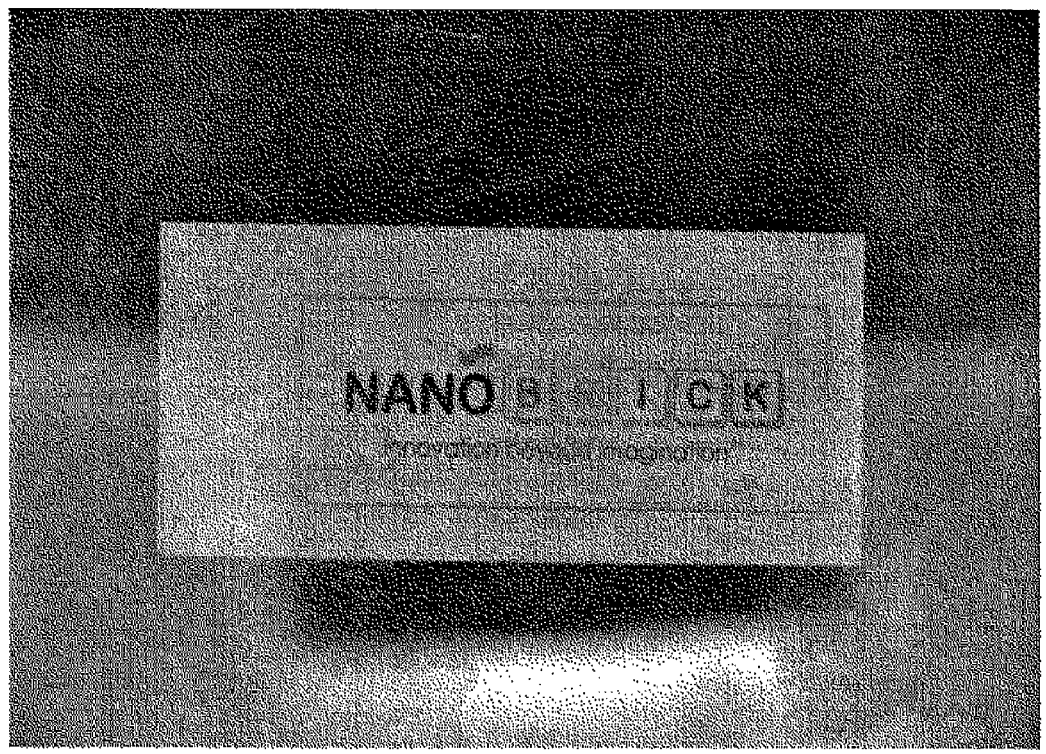
FIGS. 16 and 17 are pictures illustrating results obtained by performing experiments of applying a magnetic field to a film for adjusting light transmittance in a state where the film for adjusting light transmittance is positioned on a background (for example, a logo) on which a predetermined character and drawing are printed according to an embodiment of the present invention.
Figure 17:
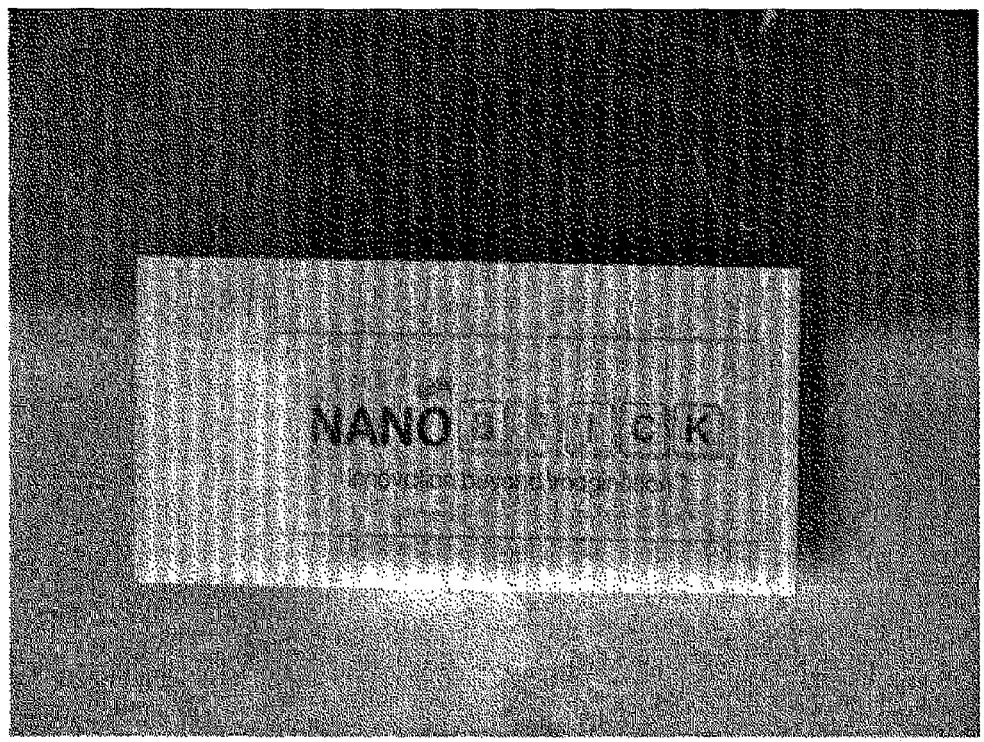

FIGS. 16 and 17 are pictures illustrating results obtained by performing experiments of applying a magnetic field to a film for adjusting light transmittance in a state where the film for adjusting light transmittance is positioned on a background (for example, a logo) on which a predetermined character and drawing is printed according to an embodiment of the present invention. As described above with reference to FIGS. 14 and 15, by applying a magnetic field with a specific striped pattern, a logo printed on the background can be partially transparently or opaquely presented according to an application pattern of the magnetic field. In view of the experiment result, it is confirmed that a tag or an advertisement promotion indicator for preventing forgery may be implemented if the film for adjusting light transmittance according to the present invention is used.

As described above, the present invention is described with specified matters such as specific components and limited embodiments and drawings, but this is provided for a general understanding of the present invention. The present invention is not limited to the embodiment described above, and various modifications and changes are possible from the descriptions by a person having ordinary skill in the art to which the subject matter pertains.

Therefore, the idea of the present invention should not be determined in a manner limited to the described embodiments, and it should be understood that the accompanying claims and all equivalents or equivalent modifications to the claims belong to the scope of the idea of the present invention.

For example, a method and a device for adjusting light transmittance described with reference to FIGS. 5 to 17 can be used as a method for adjusting transmittance of a magnetic solution or transmittance of an indication area in a composite film or method for preventing forgery described with reference to FIGS. 1 to 4. That is, each embodiment described with reference to FIGS. 1 to 4 can be used in combination with embodiments described with reference to FIGS. 5 to 17. In this manner, a more sophisticated function for preventing forgery can be achieved. That is, if the transmittance of a magnetic solution used in FIGS. 1 to 4 changes in an analog method or continuously, a technique for preventing forgery can be more sophisticated.

In the same manner, a method and film for adjusting light transmittance described with reference to FIGS. 5 to 17 can be independently used as a technique for preventing forgery separate from a composite film and method for preventing forgery in FIGS. 1 to 4. This has been briefly described above and it can be used as a function different from a function for preventing forgery.

In addition, in order to reflect light in a specific wavelength, a solvent included in the magnetic solution may further include at least one of an inorganic pigment, a dye, a fluorescent material, phosphor, a luminous substance, and a material having a structural color, and in order to reflect light in a specific wavelength, the plurality of particles may include at least one component of an inorganic pigment, a dye, a fluorescent material, phosphor, a luminous substance, and a material having a structural color.

Meanwhile, a configuration may be considered in which an expressive material, of which a predetermined characteristic is expressed when specific energy is applied, is not present separately from the magnetic solution in the cured medium, but is present in the magnetic solution. That is, in embodiments described with reference to FIGS. 5 to 17, an expressive material in which a predetermined characteristic is expressed when specific energy is applied may be included in the magnetic solution.

In addition, in the present invention, it may be determined whether a product is forged or not by using a method itself for adjusting light transmittance using magnetic particles.

The invention claimed is:

1. A composite film for preventing forgery comprising:
   an indication area,
   wherein the indication area comprises a magnetic solution distributed in a cured medium,
   the magnetic solution is a colloidal solution in which a plurality of magnetic particles charged in the same polarity are dispersed in a fluid, at least one of reflective light and transmittance of the magnetic solution changing when a magnetic field is applied, and
   an expressive material, of which a predetermined characteristic is expressed when specific energy is applied, is present separately from the magnetic solution in the cured medium.

2. The composite film for preventing forgery according to claim 1, wherein the indication area is formed by encapsulating the magnetic solution with a light transmissive material, mixing the capsule into a liquid medium before being cured, applying external energy to the liquid medium, and curing the liquid medium into the cured medium.

3. The composite film for preventing forgery according to claim 1,
   wherein the cured medium is reversibly phase-changed.

4. The composite film for preventing forgery according to claim 1,
   wherein the cured medium comprises two or more solutions, and
   the cured medium is cured by external energy, only when the solvent is mixed.

5. The composite film for preventing forgery according to claim 1,
   wherein the magnetic particles comprise elements of Fe, Ni, or Co, or a combination thereof.

6. The composite film for preventing forgery according to claim 1,
   wherein distances among the magnetic particles change depending on a strength or a direction of an external magnetic field, a wavelength of the reflected light changes corresponding to the change of the distances among the magnetic particles, and thus presented colors change.

7. The composite film for preventing forgery according to claim 1,
   wherein when the external magnetic field is applied and transmittance of the magnetic solution changes, the degree of aligning the magnetic particles in a direction of the applied external magnetic field changes so that light transmittance is changed.

8. The composite film for preventing forgery according to claim 1,
   wherein the expressive material expresses a specific characteristic by thermal energy, light energy, chemical energy, electric energy, electromagnetic wave energy, kinetic energy, or a combination thereof.

9. The composite film for preventing forgery according to claim 1,
wherein a color of the expressive material changes according to an incidence angle or an observation angle of external irradiation light.

10. The composite film for preventing forgery according to claim 1,
wherein the magnetic solution is formed into a specific pattern on the indication area.

11. A method for manufacturing a composite film for preventing forgery, comprising steps of:
mixing an expressive material that expresses a predetermined characteristic when specific energy is applied, into a liquid medium which is cured when specific energy is applied from outside,
forming an emulsion by mixing the liquid medium and a magnetic solution, which is a colloidal solution in which magnetic particles charged in the same polarity are dispersed in a fluid and of which at least one of reflective light and transmittance changes when a magnetic field is applied to the magnetic solution,
coating the emulsion on a substrate or a surface of a corresponding target, and
curing only the liquid medium by applying external energy to the emulsion.

12. A composite method for preventing forgery, comprising steps of:
providing an indication area on a surface of a corresponding target, wherein the indication area comprises a magnetic solution distributed in a cured medium, the magnetic solution is a colloidal solution in which magnetic particles charged in the same polarity are dispersed in a fluid, at least one of reflective light and transmittance of the magnetic solution changing when a magnetic field is applied, and an expressive material, of which a predetermined characteristic is expressed when specific energy out of various kinds of energy is applied, is present separately from the magnetic solution in the cured medium;
firstly identifying at least one of a wavelength or transmittance of reflective light by applying an external magnetic field to the indication area;
secondly identifying an expression characteristic of the expressive material by applying specific energy to the indication area; and
a step of determining authenticity of the corresponding target based on at least one of results obtained from the firstly identifying and the secondly identifying.

13. A computer-readable recording medium comprising a computer program that is run by a computer and executes instructions,
wherein the instruction comprises:
a first instruction for identifying at least one of a wavelength or transmittance of reflective light by applying an external magnetic field to a target area of a corresponding target;
a second instruction for identifying an expression characteristic of a expressive material by applying specific energy to the target area; and
a third instruction for determining authenticity of the corresponding target based on at least one of results obtained from the firstly identifying and the secondly identifying.

14. The composite film for preventing forgery according to claim 1,
wherein the transmittance of light that enters the indication area is controlled by applying a magnetic field to the magnetic solution so that a plurality of magnetic particles are aligned in a direction parallel to a direction of the magnetic field.

15. The composite film for preventing forgery according to claim 14,
wherein at least one of viscosity of the solution, an amount of additive added to the solution, a specific gravity difference between the plurality of particles and a solvent, and external energy applied to the solution is adjusted so that a state where the plurality of particles are aligned is maintained after the magnetic field is blocked.

16. A method for adjusting light transmission or a method for preventing forgery using magnetic particles, comprising:
applying a magnetic field to a plurality of magnetic particles in a state where the plurality of magnetic particles are dispersed in a solvent so that the plurality of particles are aligned in a direction parallel to a direction of the magnetic field, and
continuously changing a direction of the magnetic field to continuously change a direction in which the plurality of particles are aligned so that transmittance of light entering the plurality of particles and the solvent is changed continuously.

* * * * *